Patented Dec. 26, 1950

2,535,082

UNITED STATES PATENT OFFICE 2,535,082

ACETONITRILE PRODUCTION

John E. Mahan, Bartlesville, Okla., assignor to Phillips Petroleum Company, a corporation of Delaware No Drawing. Application December 15, 1947,
Serial No. 791,932

14 Claims. (Cl. 260—465.3)

This invention relates to a process for the preparation of acetonitrile. In one of its more specific aspects, it relates to a process for the preparation of acetonitrile by the interaction of ammonia with aliphatic olefins of three to five carbon atoms per molecule.

This application is a continuation-in-part of my co-pending application Serial No. 589,457, filed April 20, 1945, issued December 16, 1947, as U. S. Patent No. 2,432,532.

Heretofore the application of acetonitrile in the field of industrial chemistry has been retarded due to the lack of an economical synthesis of this potentially valuable material. In addition to the classical applications of acetonitrile as an organic intermediate, its use in vitamin synthesis has been reported. Furthermore, because of its stability under a wide range of conditions, the application of acetonitrile as a specialty solvent merely awaits an efficient and economical method of synthesis. Conventional laboratory methods of preparing acetonitrile, such as the dehydration of acetamide or the interaction of ethyl halides and alkali metal cyanides have been of negligible practical value industrially. The most promising synthesis has been the reaction of acetylene and ammonia at temperatures of about 750° F. in the presence of contact catalysts. But, while considerable attention has been accorded to this reaction, it suffers from several disadvantages. In general, reaction conditions in the acetylene-ammonia systems are favorable to the formation of pyridine derivatives. In order to suppress such side reactions, excessively long contact times have been required. A further disadvantage of the acetylene system is the practical necessity of working at low pressures to avoid explosive decomposition of the acetylene.

An object of this invention is to provide a process for the production of acetonitrile.

Another object is to provide a process for the production of acetonitrile by the interaction of ammonia with an aliphatic olefin.

Still another object is to provide a process wherein an aliphatic olefin containing 3, 4, or 5 carbon atoms per molecule is reacted with ammonia in the vapor phase in the presence of selective contact catalysts such that acetonitrile is the principal reaction product.

Yet another object is to provide novel catalysts for the reaction of ammonia with propylene, butylenes and/or pentenes under selective conditions to form acetonitrile.

Other objects and advantages of the invention will be apparent, to one skilled in the art, from the accompanying disclosure and discussion.

In a preferred embodiment of my invention ammonia is reacted with one or more olefins containing from three to five carbon atoms, inclusive, in the molecule at relatively high temperatures and low pressures in the presence of a catalytically active solid contact material comprising an association of silica with alumina. The silica is preferably present in the catalyst composition as a major component thereof, i. e., the catalytic material contains more than 50 weight per cent silica on a dry basis, and the alumina is present as a minor component, i. e., less than 50 weight per cent on a dry basis. The catalysts which are usually preferred contain at least three and frequently ten or even twenty times as much silica as alumina. The catalyst may be of either synthetic or natural origin and various specific examples of each will be given hereinbelow. In place of part or all of the alumina there may be used one or more oxides of the metals selected from groups IIIB and IVA of the periodic system. As listed in "Modern Inorganic Chemistry" by Mellor (Longmans, Green & Company, 1939, revised and edited by G. D. Parkers), on page 118, group IIIB consists of boron, aluminum, gallium, indium and thallium, and group IVA consists of titanium, zirconium, hafnium and thorium.

The simple monoolefins of three, four and five carbon atoms may be utilized in my process. Propylene ($C_3H_6$) is a particularly valuable hydrocarbon for this reaction with ammonia to yield acetonitrile. Butene-1 and isobutylene are also highly satisfactory materials for use as feeds to the process of my invention. In general lower yields are obtained from the higher molecular weight olefins. Although some acetonitrile is produced with olefins of more than five carbon atoms, the yield is generally not sufficient to be of great commercial interest at the present time.

The catalysts of the present invention may be prepared in a variety of ways, and are ordinarily employed in the form of pellets or other small particles, through a bed of which the reaction mixture is passed in vapor phase. However, the catalysts may be very finely divided and used in the form of a suspension in the gaseous reaction mixture in accordance with the now well-known techniques of employing powdered catalysts, such as in a "fluidized bed."

The synthetically prepared catalysts which are preferred may be considered to be in the form of synthetic hydrous silica gel activated with minor portions of one or more hydrous oxides of metals of groups IIIB or IVA of the periodic system. In general, these catalysts are preferably prepared by first forming a hydrous acidic silica gel or jelly from an alkali metal silicate and an acid, washing soluble material from the gel, treating or activating the gel with an aqueous solution of a hydrolyzable salt of a suitable metal, and subsequently washing and drying the treated material. In this manner, a part of the metal, presumably in the form of a hydrous oxide or loose hydroxide compound formed by hydrolysis, is selectively adsorbed by the hydrous silica, and is not removed by subsequent washing. This selective adsorption is attested by a decrease in the metal content of the activating solution as well as a decrease in pH as the activation progresses. A silica-alumina catalyst is prepared by treating a wet or partially dried hydrous silica gel with an aluminum salt solution, such as a solution of aluminum chloride or sulfate, and subsequently washing and drying the treated material. However, catalysts of a very similar nature but differing among themselves as to one or more specific properties, may be prepared by using, instead of, or in addition to, an aluminum salt, a hydrolyzable salt of another metal selected from group IIIB or from group IVA of the periodic system, and may be referred to in general as "silica-alumina type" catalysts. More particularly, salts of indium and thallium in addition to aluminum in group IIIB may be used, and salts of titanium, zirconium and thorium in group IVA may be used to treat silica gel and to prepare catalysts of this general type, although salts of the other metals in these groups are also useable. Boron in the form of boric acid, or a soluble borate such as sodium borate, may be incorporated with silica gel. Whether prepared by this method or by some modification thereof, the catalyst will contain a major portion of silica, and the minor portion of metal oxide. This minor portion of metal oxide, such as alumina, may be as low as 10% by weight, and may even fall in the range of 0.1 to 2 per cent by weight. However, a metal oxide content of up to 25 per cent is not uncommon, and proportions up to 50% are operable though seldom used.

In the above-outlined procedure, the starting materials are usually chosen from the water-soluble silicates and the commercially available mineral acids. Sulfuric and hydrochloric acids are preferred on economic grounds, although any acid may be used which will provide suitable hydrogen ion concentration and form a silica hydrogel of proper consistency. Thus, phosphoric, acetic, nitric, and boric acids may be used in certain instances. Preferably an alkali metal silicate solution is introduced into an excess of the acid and the resulting mixture is allowed to set to a gel before washing with water to remove soluble materials. The gel formed should be acidic and should be partially dried and washed free of excess acid prior to activation, and the extent of drying is carefully controlled since the eventual catalyst activity is apparently somewhat dependent on the maintenance of the hydrous oxide composition prior to the activation treatment. The salt solution for activation may be prepared from any water-soluble, hydrolyzable salt of one or more of the metals indicated, with the sulfate or chloride being preferred. Other alternate salts include acetates and nitrates. The adsorption of the hydrous oxide by the silica gel proceeds smoothly with hydrated silica gel, whereas with dried silica the adsorption and the activation may be much less satisfactory. Active catalysts are preferably rinsed free of the salt solution and a moderate concentration effect or "curing" may be obtained by partial drying of the rinsed gel. The final washing then serves to remove unadsorbed salts and free acid, and the final drying which is performed at moderate temperatures produces hard, brittle granules of gel containing negligible quantities of compounds other than silica and the metal oxide or oxides.

Modifications may be made in the foregoing procedure and catalysts of suitable activity may result. One alternative is the addition of the metal salt to the alkali metal silicate before gelation. This method enables the incorporation of greater proportions of metal oxide, but the proper degree of alkali metal salt removal may be more difficult. Non-uniform materials usually result from the mechanical mixing of hydrous metal oxide and silica gels, so that catalysts prepared in this manner may be less satisfactory. Other means of accomplishing the preparation may be devised, however, in view of the foregoing description.

As indicated above, the finished gel-type catalysts comprise essentially silica and metal oxide, with variant quantities of water. The metal oxide may be present in minor activating quantities of about 2 or less to about 25 weight per cent of the total oxides. Still greater amounts up to about 50 weight per cent may be added if desired, although the activity of the catalyst may be adversely affected. In order to retain the selectivity of the catalyst for the present reaction, other heavy metal oxides than those hereinbefore recited, or salts, are usually absent from the starting materials and the finished gel.

The catalysts prepared by this method may be subjected to a mild dehydration treatment at temperatures of about 200 to about 300° F. just prior to introduction of the reaction mixture. The dehydration is usually accomplished by passing a stream of an inert hydrocarbon or other gas through the catalyst bed at the designated low temperatures. This dehydration may, of course, be accomplished gradually during operation through the agency of the feed mixture, but an initial period of somewhat low conversion may result. Prior to this step, drying temperatures in the catalyst preparation procedure are not usually higher than subsequent initial operating temperatures.

A very effective synthetic catalyst for the present reaction may be prepared by first precipitating silica from a solution of sodium silicate. To a slurry of the silica is added aluminum chloride plus zirconium oxychloride. Ammonia is then added and the resulting gel is filtered, washed and dried in a conventional manner. Catalytic materials prepared in this manner, containing from 75 to 95 per cent silica and from 25 to 5 per cent alumina plus zirconia, may be ground, washed, dried, pelleted and calcined, for example at 1500° F. Such catalysts may be prepared in the form of pills or extruded granules with or without binding materials, and in any event will contain a small amount of bound water after washing and drying.

Other suitable synthetic catalysts may be prepared in the form of beads, for example by co-precipitating silica and alumina as a hydrogel, allowing the liquid hydrogel or solution to flow into a body of mineral oil and therein break into individual drops, and collecting the beads which result from gelation of these drops. The thus-prepared beads are then subjected to a series of treatments involving washing, base-exchange for removing sodium, and further washing and drying to form a finished hard bead. A preferred catalyst of this type contains about 90 per cent silica and 10 per cent alumina together with one per cent or less water.

Various other methods of preparing synthetic silica-alumina type catalysts are well known in the art, and the use of such catalysts is to be considered within the scope of the present invention.

Of the naturally occuring materials suitable for catalysts in the practice of my invention, or which, with suitable treatment, act as catalysts, the preferred catalysts occur in nature (before activation) as montmorillonites, which are believed to have the ideal formula

and an actual formula corresponding to $MgO \cdot Al_2O_3SiO_2 \cdot nH_2O$, since in nature the ideal formula is not realized due to substitutions. The natural montmorillonite clay has a crystalline rather than an amorphous or gel structure, as exemplified by silica gel. One apparently typical substitution in the formula of the product as found in nature is partial replacement of aluminum by magnesium. This montmorillonite mutation does not appear to be haphazard, but characteristically every sixth aluminum ion is apparently supplanted by a magnesium ion, and this replacement of a trivalent cation (aluminum) by a divalent cation (magnesium) is believed to give rise to a deficiency in positive charge. The crystal lattice of the ideal montmorillonite unit crystal cell is characterized by a layer configuration, and each layer is believed to consist of four sheets of oxygen, between the outer sheets of which in the tetrahedral position are located the silicon atoms; in the octahedral position are the aluminum atoms, and in the same oxygen sheets which form the boundaries of the octahedrals are the hydroxyl ions. The deficiency in positive charge caused in the neutral product by the replacement of the trivalent cation by the divalent cation causes the lattice to become negatively charged, and in order to neutralize this charge, various types of cations are adsorbed on the crystal protruding into the water of hydration space between the layers of montmorillonite. The cations, being exposed, are subject to mass action effects and are readily replaceable, thus giving rise to the phenomenon of base exchange which is a characteristic of the substituted montmorillonite. The raw montmorillonite clay is commonly classified as a non-swelling bentonite and is sometimes referred to as a subbentonite.

Modification of the raw montmorillonite to provide a suitable catalyst for the present invention is effected by activation. The most common form of activation is by means of an acid, and in treating a magnesium substituted montmorillonite in the raw form for use as a catalyst by acid activation, impurities are removed with attendant increase in effective catalytic surface; also, exchangeable ions are replaced by hydrogen, i. e., the surface cations originally present in a magnesium substituted montmorillonite lattice are replaced by hydrogen ions as a result of the activation. Thus, the activated material may be termed a magnesium substituted hydrogen montmorillonite. A further effect of the acid treatment in activating the montmorillonite clay may well be to dissolve a disproportionate amount of alumina, thus increasing the percentage of magnesia. A sample of the activated montmorillonite clay is characterized by the following analysis:

|  | Percent by weight |
|---|---|
| Magnesia | 4.9 |
| Alumina | 14.4 |
| Water | 21.9 |
| Silica | Remainder |

The catalyst is of the solid contact type and is preferably used in this invention in the form of pellets ranging in size from four to twenty mesh. Ten grams of this particular material, in the form of 4–8 mesh pellets, was washed with 50 ml. of distilled water, whereupon the wash water acquired a pH of 3.0. It is obvious that the percentages of magnesia, alumina, silica, and water will vary within reasonable limits, depending on various factors, such as the source of the clay, the extent and character of the acid treatment, and other factors.

The montmorillonite catalyst just described is further characterized in an article by Davidson et al. at pages R–318 to 321 of "National Petroleum News," issue of July 7, 1943.

Other naturally occurring composites of silica and alumina are likewise effective as catalysts for the present reaction, although generally not so active as the activated montmorillonite described. The bentonites as a class are subject to activation with acid to form effective catalysts. The bentonites consist mainly of hydrous aluminum silicate and usually contain from 15 to 18 percent alkali metal or alkaline earth metal oxides. Their chemical composition can not be said to be fixed within narrow limits nor are their physical properties constant because of the varying sources of the bentonite and varying experiences of a particular bentonite in nature. Glauconites are likewise susceptible to acid activation. Fuller's earth, preferably activated by heating, is another catalyst for this reaction, as are various other naturally occurring aluminum hydrosilicates.

In any event, the ultimate analysis of the catalyst will show more than 50 per cent silica on a dry basis, the alumina together with any other metal oxides present will comprise the remainder on a dry basis. The catalyst may contain a limited amount of water, usually in the range of 5 per cent or less.

Many of the catalysts of this invention are of such nature that they may be applied to other materials which act as supports. Examples of such materials are well known to those skilled in the art, and there may be mentioned pumice, kieselguhr, porcelain chips, and the like. These supporting materials are substantially inactive as catalysts, and when used it will be understood that the percentage compositions given herein apply only to the catalytic material supported thereon and not to the total composite supported catalyst. The catalytic material may be applied to the support by any of the well known procedures, such as by mixing in a ball mill followed by pelleting or pilling, effecting the precipitation of the catalytic material in the presence of particles of the support, and the like.

During the acetonitrile-producing reaction carbon is laid down on the catalyst, which ultimately makes necessary the reactivation of the catalyst. This may readily be accomplished by subjecting the carbonaceous catalyst to the action of air or other oxygen-containing gases at an elevated temperature in known manner. The temperature preferably should not exceed 1200°

F., and some catalyst will require an even lower reactivation temperature in order to avoid a sintering or fusing of the catalytic surfaces with consequent reduction in activity of the catalyst.

Because iron and steel have a very strong catalytic action on ammonia to cause the decomposition thereof into nitrogen and hydrogen, such materials of construction for the catalyst case proper are ordinarily best avoided in commercial operations. However, a conventional steel or iron reactor may be successfully coated with enamel or silicous or refractory materials in order to reduce ammonia decomposition. Reactors made from aluminum cause little decomposition of ammonia, but are ordinarily not convenient for use in large installations. Vitrified silica, porcelain, and other silicous materials are suitable for fabrication into catalyst cases, and cause little or no ammonia decomposition.

In accordance with my invention in preferred form, a hydrocarbon feed stock comprising a three to five carbon atom aliphatic olefin is admixed with ammonia and the resulting reaction mixture contacted in the vapor phase at an elevated temperature in the presence of one of the catalysts herein described. Propylene, butylenes, and pentenes are suitable aliphatic olefins for use in this process. The olefins may be present in admixture with other hydrocarbons or inert gases; preferably the olefins are present in the feed stock in a concentration of at least 80 per cent by volume. The ammonia is preferably present in molar excess, based upon the content of the desired olefin in the feed stock. The reaction may be carried out at a temperature of from 900 to 1400° F. Pressures may range from subatmospheric to about 250 pounds per square inch gage or somewhat higher. Unlike an acetylene-ammonia reaction mixture, the olefin-ammonia reaction mixture of the present process is not explosive at moderately elevated pressures. However, too high a pressure is definitely undesirable in my process, because it encourages olefin polymerization and reactions which form products other than the acetonitrile desired. The reaction effluent may be cooled sufficiently to condense normally liquid constituents, the uncondensed ammonia separated therefrom, and the liquid fraction distilled to yield an acetonitrile fraction having a boiling range of about 176 to 180° F. Many alternative procedures for handling the hot effluents of the reaction and for separating therefrom the acetonitrile produced, unreacted ammonia for recycle, and various by-products for discard or use as desired, will be apparent to one skilled in the art.

When employing propylene as feed in this reaction, I have found that a mol ratio of about three mols of ammonia to one of olefin is a desirable ratio to use, although molar excesses of ammonia varying from very slightly above 1:1 to as high as 8:1 have given satisfactory results with this olefin. When other olefins are used, ratios of about three mols of ammonia to one of olefin are satisfactory, but in general higher rather than lower ratios of ammonia to olefin will be employed when using the generally less reactive C₄ and C₅ olefins. With all of the olefins, an increase in ammonia: olefin ratio up to fairly high values, such as 8:1, tends to effect a decrease in carbon deposition on the catalyst with consequent higher ultimate yields based on olefin feed and longer runs before catalyst reactivation is required.

Although under certain conditions of operation acetonitrile may be satisfactorily produced at temperatures at or about 1400° F., I prefer to operate my process at temperatures not above 1200° F. Above this level undesirable decomposition into ammonium cyanide and other products is more difficult to control so that satisfactory yields are obtained. Similarly, while in some cases it may be desirable to operate my process as low as 900° F., I prefer to carry out the reaction at 1100° F. or above in order to realize the generally greater conversions per pass obtainable. I have found the range 1100 to 1200° F. to be the preferred operating range when using any of the olefin feeds contemplated in this invention.

The present process does not suffer from pressure limitations as is the case in processes using acetylene. The reaction has been found to proceed satisfactorily at atmospheric pressure. Moderate superatmospheric pressures are usually of great advantage in actual operation of a commercial plant, and in my process I have found that they may be used with impunity, up to about 250 pounds per square inch gauge. At higher pressures undesirable polymerization of olefin and other side reactions being prominent. Preferably, a pressure within the range of about atmospheric to 100 pounds per square inch gauge is employed.

The following example is presented showing results obtainable with one of the preferred catalysts of this invention.

A vaporized mixture of propylene and ammonia blended in a mol ratio of 1:3 was preheated to about 1100° F. and charged to a glass catalyst case containing 180 ml. of a granular silica base catalyst. This catalytic material was prepared by precipitation of alumina and zirconia upon a hydrous silica gel. Its final composition was 84 per cent silica, 10 per cent zirconia, 4 per cent alumina, and 2 per cent moisture. This catalyst was dried at 1200° F. for 12 hours preceding the reaction period. The reactor temperature was maintained at between 1165 and 1200° F. and the pressure was maintained at atmospheric. A feed rate of 1.2 mols of reaction mixture per hour was employed. The effluent from the catalyst case was passed through a condenser held at approximately 32° F. The liquid condensate which was recovered was fractionally distilled and a per pass yield of 9 mol per cent of acetonitrile, based on the propylene feed, was obtained.

Inasmuch as variations of the specific operating conditions, as well as the composition of reaction mixture and the particular catalyst used, are within the broad scope of this invention, it will be understood that the example is offered by way of illustration rather than by way of undue limitation of the process.

I claim:

1. A process for the preparation of acetonitrile which comprises reacting an aliphatic monoolefin having at least three and not more than five carbon atoms per molecule with ammonia in vapor phase at a temperature within the range of from 900 to 1400° F. in the presence of a catalytically active solid contact material comprising an association of a major proportion of silica and a minor proportion of at least one oxide of a metal selected from the class consisting of the metals aluminum, indium and thallium of group IIIB and titanium, zirconium and thorium of group IVA of the periodic system.

2. A process for the preparation of acetonitrile which comprises reacting an aliphatic monoolefin having at least three and not more than five carbon atoms per molecule with ammonia in vapor phase at a temperature within the range of from 900 to 1400° F. in the presence of a catalytically active solid contact material comprising a major proportion of silica and a minor proportion of alumina and zirconia.

3. A process for the preparation of acetonitrile which comprises reacting an aliphatic monoolefin having at least three and not more than five carbon atoms per molecule with ammonia in vapor phase at a temperature within the range of from 900 to 1400° F. in the presence of a catalyst comprising synthetic silica gel subsequently promoted by a minor proportion of alumina and zirconia, said catalyst being prepared by forming an acidic hydrous silica gel, water-washing said gel, partially drying same to an extent so limited that the hydrous oxide composition of the gel is maintained, activating the resulting hydrous silica gel with an aqueous solution of hydrolyzable aluminum and zirconium salts and thereby causing adsorption of hydrous alumina and zirconia on the silica gel, and water-washing and drying the thus-activated gel.

4. A process for the preparation of acetonitrile which comprises reacting an aliphatic monoolefin having at least three and not more than five carbon atoms per molecule with ammonia in vapor phase at a temperature within the range of from 900° F. to 1400° F. in the presence of a solid contact catalyst comprising precipitated silica hydrous gel activated with alumina and zirconia hydrous gels and then dried, the silica comprising more than 50 weight per cent of the total catalyst on a dry basis.

5. A process according to claim 1 in which said monoolefin is propylene.

6. A process according to claim 1 in which said monoolefin is butene-1.

7. A process according to claim 1 in which said monoolefin is isobutene.

8. A process for the production of acetonitrile which comprises reacting a three to five carbon atom aliphatic monoolefin with ammonia in vapor phase at a temperature within the range of from 1100 to 1200° F. and at a pressure within the range of from about atmospheric to 100 pounds per square inch gauge in the presence of a solid contact catalyst comprising silica activated with a minor proportion of at least one oxide of a metal selected from the group consisting of the metals aluminum, indium and thallium of group IIIB and titanium, zirconium and thorium of group IVA of the periodic system.

9. A process for the preparation of acetonitrile which comprises reacting propylene with ammonia in vapor phase at a temperature within the range of from 900° F. to 1400° F. and at a pressure below 250 pounds per square inch gauge in the presence of a solid contact catalyst comprising an intimate association of hydrous silica gel and at least one hydrous oxide of a metal selected from the group consisting of the metals aluminum, indium and thallium of group IIIB and titanium, zirconium and thorium of group IVA of the periodic system, said catalyst containing only a small amount of water and containing not more than 25 per cent of the said metal oxide on a dry basis.

10. A process according to claim 9 in which said catlyst is composed of 84 per cent silica, 10 per cent zirconia, 4 per cent alumina and 2 per cent water.

11. A process for the production of acetonitrile which comprises reacting propylene with ammonia in vapor phase at a temperature within the range of 900° F. to 1400° F. and at a pressure below 250 pounds per square inch gauge in the presence of a solid contact catalyst comprising synthetic silica gel subsequently promoted by a minor proportion of at least one oxide of a metal selected from the class consisting of the metals aluminum, indium and thallium of group IIIB and titanium, zirconium and thorium of group IVA of the periodic system, said catalyst being prepared by forming a hydrous silica gel by introducing an alkali silicate solution into an excess of an acid and allowing the resulting mixture to set to a gel, water-washing said gel free of soluble material and partially drying to an extent so limited that the hydrous oxide composition of the gel is maintained, activating the resulting hydrous silica gel with an aqueous solution of a hydrolyzable salt of said metal and thereby causing adsorption of hydrous metal oxide on the silica gel in an amount corresponding to from 0.1 to 10 per cent of metal oxide by weight on the dry basis, and water-washing and drying the treated gel.

12. A process according to claim 11 in which from one to eight mols of ammonia per mol of propylene is used in the mixture which is reacted.

13. A process according to claim 12 in which at least three mols of ammonia per mol of propylene is used.

14. A process for the production of acetonitrile which comprises admixing propylene with ammonia in relative proportions of 3 mols of ammonia per mol of propylene and passing the resulting mixture in vapor phase at a temperature within the range of from 1100° F. to 1200° F. and at a pressure within the range of from atmospheric to 100 pounds per square inch gauge into contact with a catalyst consisting of zirconia and alumina precipitated on hydrous silica gel and having a weight per cent composition of 84 per cent silica, 10 per cent zirconia, 4 per cent alumina and 2 per cent water, and recovering the acetonitrile so produced.

JOHN E. MAHAN.

REFERENCES CITED

The following references are of record in the file of this patent:

UNITED STATES PATENTS

| Number | Name | Date |
|---|---|---|
| 1,920,795 | Jaeger | Aug. 1, 1933 |
| 2,381,709 | Apgar et al. | Aug. 7, 1945 |
| 2,432,532 | Mahan | Dec. 16, 1947 |